United States Patent

Waaben

[15] 3,651,468

[45] Mar. 21, 1972

[54] ARRANGEMENTS FOR REDUCING NOISE IN TANDEM MATRIX CIRCUITS

[72] Inventor: Sigurd Gunther Waaben, Princeton, N.J.

[73] Assignee: Bell Telephone Laboratories, Incorporated, Murray Hill, N.J.

[22] Filed: Dec. 9, 1970

[21] Appl. No.: 96,310

Related U.S. Application Data

[63] Continuation-in-part of Ser. No. 83,445, Oct. 23, 1970, abandoned.

[52] U.S. Cl.......................340/166 R, 340/173, 340/174 TB, 340/174 KC

[51] Int. Cl.......................H04q 3/00, G11b 5/00, G11c 7/00

[58] Field of Search.............340/166, 176, 174 DC, 174 KC, 340/174 TB, 173

[56] References Cited

UNITED STATES PATENTS 3,483,517 12/1969 Gange et al.........................340/166 R 3,483,541 12/1969 Wright...........................340/166 R X 3,519,995 7/1970 Gerrard..............................340/166 R

*Primary Examiner*—Donald J. Yusko

*Attorney*—R. J. Guenther and Arthur J. Torsiglieri

[57] ABSTRACT

An arrangement for decreasing the noise in tandem matrix access circuits which employ diodes to interconnect their primary and secondary sets of matrices. In particular, each rail circuit of the secondary matrix is coupled to its respective pair of rail circuits of the primary matrix by diodes which are oppositely poled with respect to one another. Connection of the rail circuits in this manner permits the nonselected rails of the secondary matrix to be coupled to ground through low impedances during selection of a particular rail of the matrix. As a result, leakage currents appearing in the nonselected rails are shunted to ground, thereby eliminating the noise effects of these currents in the matrix.

In one embodiment of the invention, the two diodes coupled to each rail of the secondary matrix are charge-storage diodes. In another embodiment, one of the diodes is a charge-storage diode whereas the other is a Schottky diode.

13 Claims, 4 Drawing Figures

INVENTOR
S.G. WAABEN
BY
Lyman Sherman
ATTORNEY

ARRANGEMENTS FOR REDUCING NOISE IN TANDEM MATRIX CIRCUITS

CROSS-REFERENCE TO RELATED APPLICATION

This application is a continuation-in-part of my copending application, Ser. No. 83,445, filed Oct. 23, 1970, now abandoned.

BACKGROUND OF THE INVENTION

This invention relates to tandem matrix access circuits employing diodes and, more particularly, to an arrangement for reducing noise in such circuits.

Tandem matrix circuits for accessing memories are known in the art. In such circuits a primary matrix is employed to select rail circuits of a larger secondary matrix. The tandem arrangement tends to drastically reduce the total number of switches needed to select the rails of the secondary matrix and, as a result, the total cost of the memory.

In some tandem matrix arrangements (see e.g., U.S. Pat. No. 3,508,203), the rail circuits of the primary and secondary matrices are interconnected through the use of simple diodes as switches. The use of simple diodes as switches further reduces the overall cost of the matrix.

The finite on-off impedance ratio of any switch limits the circuit isolation provided by the switch. Hence, a finite noise signal is leaked through each of the diode switches employed in a tandem matrix. Such noise is disruptive to matrix operation and thus, places a lower limit on the signals that can be used with the circuit.

It is, therefore, a broad object of the present invention to reduce the noise in tandem matrix circuits in which diodes are employed to interconnect the rails of the primary and secondary matrices.

SUMMARY OF THE INVENTION

In accordance with the principles of the present invention, the above objective is achieved in a tandem matrix circuit by using diodes, which are oppositely poled with respect to one another, to interconnect the rail circuits of the secondary matrix to those of the primary matrix. More specifically, two diodes are coupled to each of the rail circuits of the secondary matrix. The diodes associated with a specific rail circuit are located at opposite ends of the rail circuit and are oppositely poled with respect to one another. Each of these diodes, in turn, connects the circuit to one of its respective pair of rail circuits of the primary matrix. Connection of the rail circuits in this manner permits each of the nonselected rails of the secondary matrix to be coupled to ground through a low impedance path during selection of a particular rail of the matrix. The latter low impedance paths are established by forward-biasing one of the diodes coupled to each of the rail of the secondary matrix. Thus, leakage currents coupled to the nonselected rails in the course of such selection are shunted to ground via these low impedance paths, thereby nullifying the noise effects of such currents.

BRIEF DESCRIPTION OF THE DRAWINGS

A clearer understanding of the above-mentioned features of the present invention can be obtained by reference to the following detailed description taken in conjunction with the accompanying drawings, in which.

DETAILED DESCRIPTION

Figure 1:
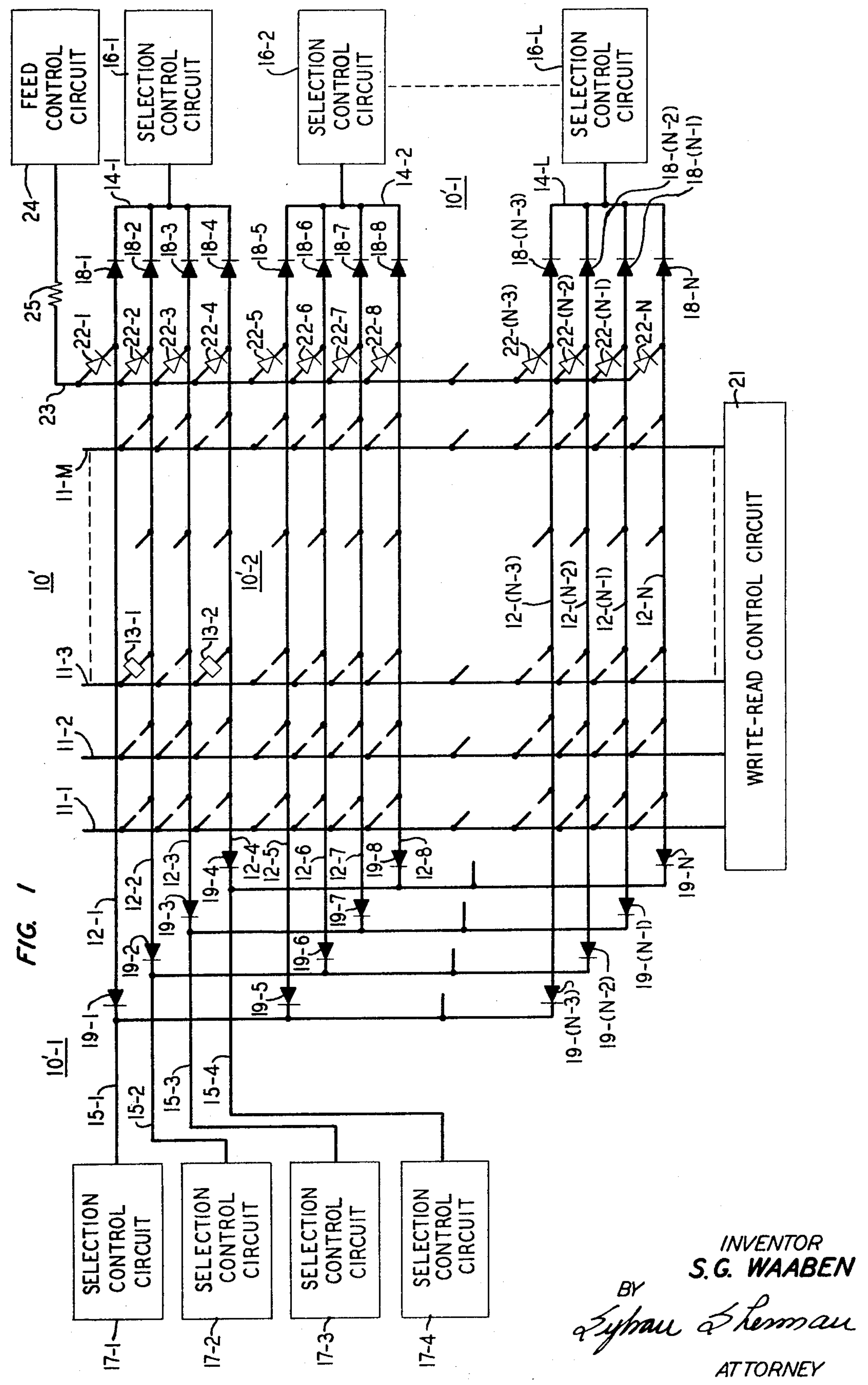
FIG. 1 is a tandem matrix circuit in accordance with the principles of the instant invention.

FIG. 1 shows a first embodiment of a tandem matrix circuit 10' in accordance with the principles of the present invention. Tandem matrix 10' comprises a primary matrix circuit 10'–1 and a secondary matrix circuit 10'–2. Secondary matrix 10'–2 includes two sets of rail circuits, column rail circuits 11–1 to 11–M and row rail circuits 12–1 to 12–N. The row rail circuits are orthogonally arranged, in a drawing sense, with respect to the column rail circuits. Primary matrix 10'–1 similarly includes two sets of rail circuits. These, as illustrated in FIG. 1, include a first set of selection control rail circuits 14–1 to 14–L connected at one end of the row rails and a second set 15–1 to 15–4, connected at the other end of the row rails.

Each row rail of matrix 10'–2 is controlled by a specific rail circuit of matrix 10'–1. For example, row rail 12–1 is controlled at its right end by selection control rail 14–1, and at its left end by selection control rail 15–1.

The row rails of matrix 10'–2 are grouped such that those rails whose right ends are controlled by the same selection rail of the first set of rails of matrix 10'–2 comprise a single group. In the embodiment of FIG. 1, each of the latter groups comprises four row rail circuits. The row rail circuits in the different groups are arranged such that those rails whose left ends are controlled by the same selection rail of the second set of rails of matrix 10'–1 are correspondingly located in the respective groups. These relationships are illustrated in FIG. 1 wherein row circuits 12–1 to 12–4 of a first row circuit group have their right ends controlled by selection circuit 14–1, and wherein row circuits 12–1 and 12–5, which have their left ends controlled by selection rail circuit 15–1, and which belong to different groups, are arranged in corresponding locations in their respective groups.

The right and left ends of the row rail circuits 12 are each coupled to their respective selection control rails through a diode. In particular, diodes 18–1 to 18–N couple the right ends of rails 12 to their respective selection rails, and diodes 19–1 to 19–N couple the left ends of the latter row rails to their respective selection rails. The diodes 18 and the diodes 19 are poled such that their anodes are connected to the ends of the row rail circuits and their cathodes to the selection control rail circuits. Thus, with respect to one another, the diodes coupling each row rail to its respective pair of selection rails are oppositely poled.

To the left of diodes 18 is situated a vertical feed rail circuit 23. At the intersections of feed rail circuit 23 and row rails 12, diodes 22–1 to 22–N interconnect the respective intersecting rail circuits. The upper end of feed rail circuit 23 is coupled through a current limiting resistor 25 to a feed control circuit 24.

Figure 2:
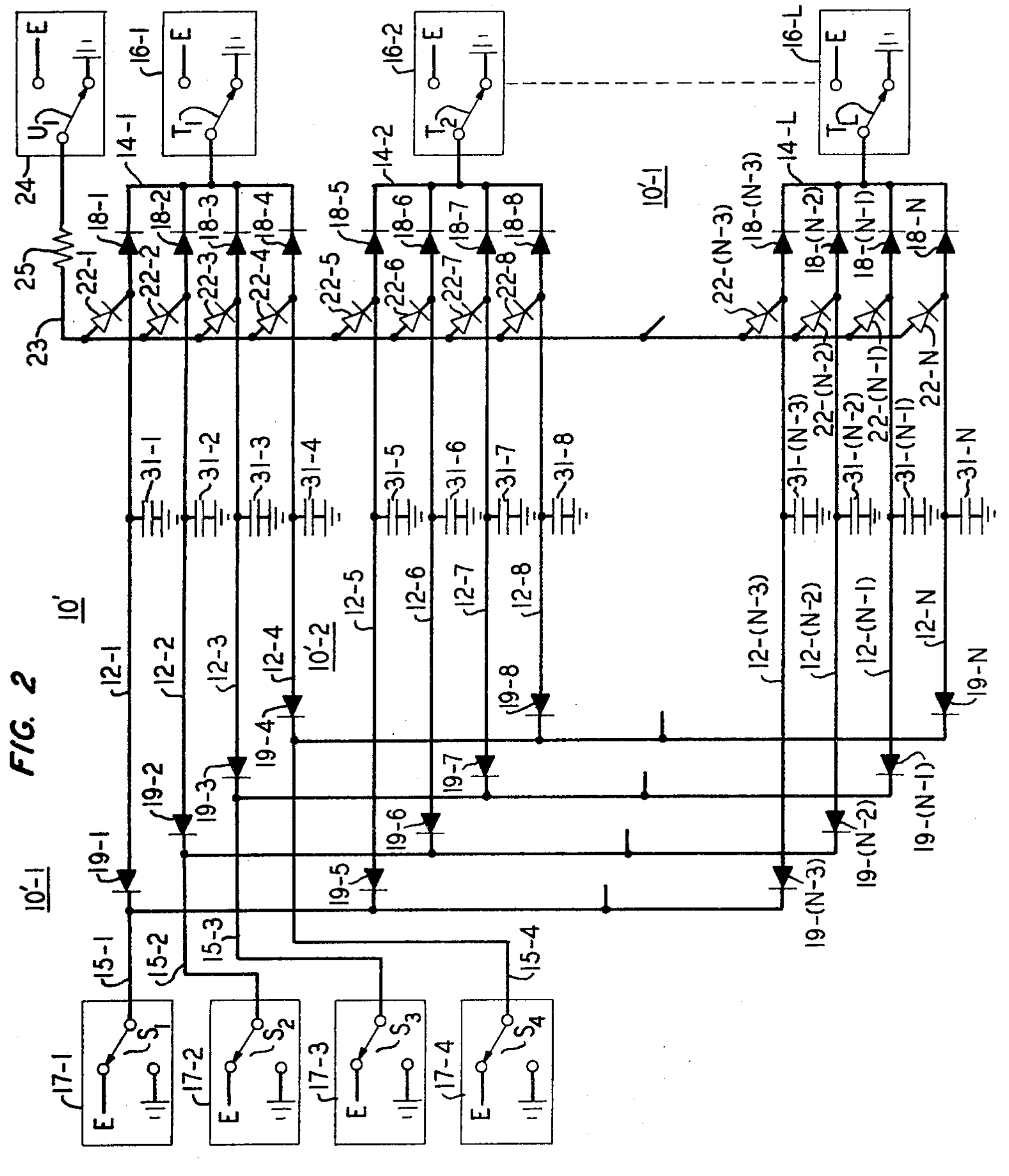
FIG. 2, included for the purposes of explanation, is a simplified version of the embodiment of FIG. 1.

As already noted, row rail circuits 12 are orthogonally arranged, in a drawing sense, with respect to column rail circuits 11. At the intersections of the respective rail circuits of these two sets of rails, cross-point loads, of which two loads 13–1 and 13–2 are illustrated, interconnect pairs of the intersecting rail circuits. The other cross-point loads, not specifically illustrated in FIG. 2, are schematically represented by diagonal broken lines at the cross-point positions. Each of the cross-point loads typically can be a two diode memory, such as is disclosed in my copending application, Ser. No. 864,705 filed on Oct. 8, 1969. Alternatively, more conventional types of cross-point loads, such as, for example, flip-flops or drives for magnetic memory circuits, can also be employed.

Each of the selection control rail circuits of matrix 10'–1 is coupled to a corresponding selection control circuit. In particular, selection rail circuits 14–1 to 14–L are connected, respectively, to control circuits 16–1 to 16–L and rail circuits 15–1 to 15–4 are connected to control circuits 17–1 to 17–4, respectively. The column rail circuits of matrix 10'–2, on the other hand, have their lower ends coupled to write-read control circuit 21. Each of the control circuits supplies electrical control signals to its respective rail circuits. It should be noted, however, that while circuit 21, in the instant embodiment, is employed to select column rails 11, it is apparent that an arrangement similar to that employed to select row rails 12 could have also been used.

Each of the diodes 18 and each of the diodes 19 is selected to have a minority-carrier lifetime which is longer than the time allocated for the selection of a particular row rail of matrix 10′. The latter lifetime is defined as the time it takes minority-carriers, in the absence of a bias, to become depleted by recombination with one another across the diode junction. Each of the diodes 22, on the other hand, is selected to have minority-carrier lifetime which is at least less than one-half the minority-carrier lifetime of each of the diodes 18 and each of the diodes 19. It should be noted, however, that the above-mentioned relationship only expresses an upper limit, and, in actual practice, it is preferable that the minority-carrier lifetimes of each of the diodes 22 be at least an order of magnitude less than those of diodes 18 and diodes 19. The foregoing requirements on the minority-carrier lifetimes of diodes 18, diodes 19 and diodes 22 is readily met by selecting diodes 18 and diodes 19 as charge-storage diodes and diodes 22 as Schottky diodes. A detailed description of charge-storage diodes and Schottky diodes is given, respectively, by J. L. Moll, S. Krakauer and R. Shen in their article entitled, "P-N Junction Charge-Storage Diodes," Proceeding of the IRE, Jan. 1962, page 43, and S. M. Sze in Physics of Semiconductor Devices, Chap. 8, John Wiley and Sons, 1969.

In order to facilitate the discussion of the operation of tandem matrix 10′, such operation will be described in terms of a word organized memory. That is to say, in each operation of matrix 10′, an entire word is to be written into or read out of the matrix, where a particular word corresponds to the information stored in the cross-point loads along a single row rail circuit of matrix 10′–2.

In operation, a word is written into or read out of matrix 10′ by selecting all the column rail circuits 11 of matrix 10′–2. Simultaneously, a particular row rail circuit is selected while the remaining row rail circuits are clamped through low impedances to substantially ground potential. Such operation enables the cross-point loads associated with the selected row rail circuit to be energized in a manner which minimizes the noise generated in the cross-point loads corresponding to the nonselected row rail circuits.

More particularly, column rail circuits 11 are selected in a conventional manner by the operation of write-read control circuit 21. The latter selects each column rail circuit by applying thereto a signal indicative of whether a read or write operation is to occur. Simultaneously with such selection, a particular row rail circuit is selected and the remaining row rails clamped through low impedances to ground by the operation of selection control circuits 16, selection control circuits 17 and the selection rail circuits of matrix 10′–1.

The above-indicated operation of the row rail circuits of matrix 10′–2, which results in excitation of the cross-point loads of a particular row rail will be more fully described with reference to FIG. 2, in which a simplified version of matrix 10′ is shown.

In FIG. 2, the loading effect of the cross-point loads and selected column rail circuits on the row rail circuits 12–1 to 12–N is schematically represented by means of loading capacitors 31–1 to 31–N, respectively. Each of the latter capacitors has a capacitance equal to the equivalent effective capacitance of the cross-point loads associated with its row rail circuit. Thus, e.g., capacitor 31–1 has a capacitance equal to the equivalent effective capacitance of the cross-point loads loading rail 12–1.

Each of the selection circuits 16 and each of the selection circuits 17 is schematically shown in FIG. 2 as a switch capable of clamping its corresponding selection rail circuit to either a positive potential E or ground potential. Feed control circuit 24 is shown as a similar switching arrangement. Typically, the schematically illustrated switches of circuits 16 and circuits 17 can be conventional transistors connected in a common emitter configuration. The switch of circuit 24, on the other hand can be a conventional transistor connected in a common collector arrangement.

Prior to the selection of any one of the row rail circuits 12, switches $S_1$ to $S_4$ of circuits 17–1 to 17–4, respectively, clamp their corresponding selection control rails 15–1 to 15–4 to positive potential E. Switches $T_1$ to $T_L$ of selection circuits 16–1 to 16–L, respectively, and switch $U_1$ of feed circuit 24, on the other hand, clamp their respective rails to ground potential. Thus, in the quiescent state indicated in FIG. 2, each of the diodes 19 is solidly back-biased and, therefore, nonconducting. Moreover, since no forward-bias exists across diodes 18 or diodes 22, these groups of diodes are similarly nonconducting.

In terms of FIG. 2, excitation of the cross-point loads of a particular row rail circuit of matrix 10′–2 corresponds to excitation of a particular one of the capacitors 31. For the purposes of explanation, let it be assumed that capacitor 31–1 of rail 12–1 is to be energized. This is accomplished by the following sequence of switching operations. Switches $T_2$ to $T_L$ are simultaneously coupled to positive potential E and remain coupled thereto. Switch $U_1$ is momentarily coupled to positive potential E and then returned to and held at ground potential. Thereafter, switch $T_1$ is connected to positive potential E after switches $S_1$ to $S_4$ are simultaneously coupled to ground. With switches $T_1$ and $S_1$ to $S_3$ retained in the latter positions, switches $T_2$ to $T_L$ are simultaneously returned to ground potential and held there. Immediately thereafter, switch $S_1$ is coupled to potential E, thereby completing the switching sequence and effecting the required charge-storage in capacitor 31–1.

More specifically, excitation of capacitor 31–1 is initiated by the action of switches $T_2$ to $T_L$ which clamp selection rail circuits 14–2 to 14–L to positive potential E. Subsequently, a positive potential is applied to feed rail 23 by the operation of switch $U_1$, which similarly clamps one end of resistor 25 to positive potential E. Since selection rail 14–1 remains at ground potential, via switch $T_1$, the positive potential on rail 23 causes diodes 18–1 to 18–4, and their corresponding diodes of diode array 22, to become forward-biased. Thus, current flows from circuit 24 through diode combinations (22–1, 18–1), (22–2, 18–2), (22–3, 18–3) and (22–4, 18–4) in the forward direction, and from the latter diodes through switch $T_1$ to ground. As a result of the forward current flow, each of the charge-storage diodes 18–1 to 18–4 stores a quantity of charge.

The positive potential on rail 23 similarly forward-biases the remainder of the diodes in array 22. However, since rails 14–2 to 14–L are clamped to potential E, the positive potential on rail 23 is insufficient to also forward-bias diodes 18–5 to 18–N. Thus, no current flows through each of the latter diodes.

After the switch $U_1$ is returned to ground potential, each of the diodes 22 and each of the diodes 18–1 to 18–4 cease to conduct. The latter diodes, however, retain the charge accumulated during forward conduction.

Switch $T_1$ is then switched to potential E, thereby clamping rail circuit 14–1 to that potential. Simultaneously, rails 15–1 to 15–4 are clamped to ground through switches $S_1$ to $S_4$, respectively. The potential E, coupled through rail 14–1 to the cathodes of diodes 18–1 to 18–4, causes the charge stored in these diodes to be transferred out of the diodes by reverse conduction. When conducting in this reverse manner, the diodes have low impedances in the reverse direction. As a result, the potential E is effectively coupled to rail circuits 12–1 to 12–4, thereby forward-biasing charge-storage diodes 19–1 to 19–4. Conduction paths are thus established through the diodes 18–1 to 18–4, in the reverse direction, and their respective rails 12, diodes 19, rails 15 and switches of selection circuits 17. The charge stored in diodes 18–1 to 18–4 is transferred over these conduction paths and is accumulated in charge-storage diodes 19–1 to 19–4 respectively.

Once all the charge is expelled from the diodes 18–1 to 18–4, they return to a nonconducting state due to the applied reverse bias. The potential E, therefore, is decoupled from circuit rails 12–1 to 12–4. Diodes 19–1 to 19–4 remain charged with minority-carriers and, hence, can function as bidirectional short circuits.

Having moved the stored charge from diodes 18–1 through 18–4 into diodes 19–1 to 19–4, rails 14–2 to 14–L are then clamped through switches $T_2$ to $T_L$, respectively, to ground potential. Immediately after the operation of switches $T_2$ to $T_L$, switch $S_1$ couples potential E to selection rail 15–1. Since charge has been transferred to and stored in diode 19–1, the potential E, coupled through rail 15–1 to the anode of diode 19–1, causes the stored charge to be transferred from the diode by reverse conduction. Since, however, diode 18–1 remains nonconducting because its anode is coupled to the potential E through rail 14–1, the charge expelled from diode 19–1 is transferred over rail 12–1 into capacitor 31–1 and is stored therein. Thus, excitation of capacitor 31–1 by selection of rail 12–1 is complete.

The potential E coupled to rail 15–1, while causing diode 19–1 to conduct in the reverse direction, also reverse-biases the other diodes (i.e., diodes 19–5, 19–9...19–(N-3)) similarly coupled to rail 15–1. When operating in the reverse bias mode, each of these diodes conducts a finite amount of leakage current in the reverse direction. Thus, leakage current flows along the rails 12–5, 12–9,...12–(N-3), as a result of clamping rail 15–1. Each of the latter rails, however, reside at a voltage which is slightly below the voltage required to bring the diode 18 associated with the rail into strong forward conduction. Thus, the leakage currents, in attempting to raise the voltages of the rails, cause the diodes 18 corresponding to the rails to conduct in the forward direction. As a result, the leakage currents in rails 12–5, 12–9,...12–(N-3) bypass their associated capacitors and are shunted to ground through the low impedance paths afforded by forward-biased diodes 18–5, 18–9...18–B(N-3), respectively. Thus, the noise in the rail loading capacitors which would have been generated by the aforesaid leakage currents is substantially eliminated.

It should also be pointed out that any currents coupled between row rails 12 as a result of inherent capacitive coupling is similarly shunted to ground through the low impedances provided by diodes 18 and 19. In the case of rails 12–2 to 12–4, forward-biased diodes 19–2 to 19–4 afford the low impedance paths. In the case of each of the other rails, a shunting path is provided by its respective diode in array 18.

Once a particular capacitor 31 has been energized, matrix 10′ can be returned to its initial state by returning switch $T_1$ to ground potential. Any excess charge stored on capacitor 31–1 is thereby shunted to ground through diode 18–1. Since diode 18–1 stores charge as a result of this forward current flow, a time equal to the minority-carrier lifetime of the diode must elapse before all its stored charge is depleted and matrix 10′ can again be energized. In instances where it is required that matrix 10′ recover in a shorter time than permitted by minority-carrier lifetime of the diodes 18, the arrangement of FIG. 3 can be employed.

Figure 3:
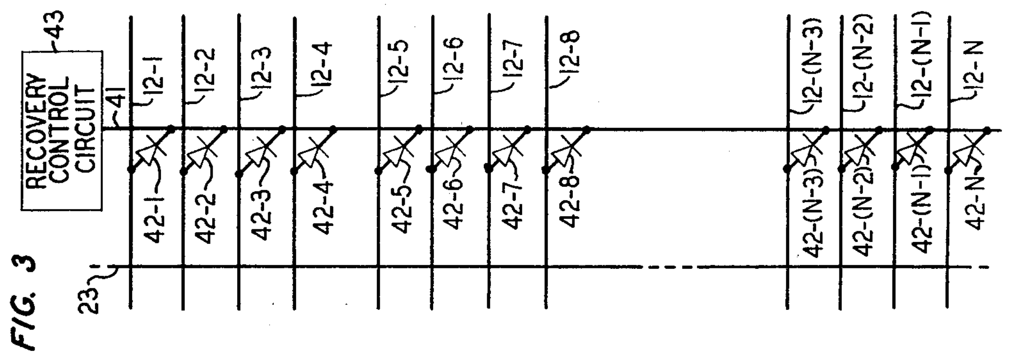
FIG. 3 is a modification of the embodiment of FIG. 1 which provides for faster recovery of the tandem matrix to its initial state.

In FIG. 3, matrix 10′ is similar in all respects to matrix 10′ of FIG. 1 except for the addition of recovery rail circuit 41 and diodes 42–1 to 42–N. To avoid repeating the entire matrix structure, only the added components are specifically shown.

Recovery rail 41, for illustrative purposes, is located to the right of feed rail circuit 23. At the intersections of rail 41 and the row rails 12–1 to 12–N, diodes 42–1 to 42–N interconnect the respective row rails to rail 41. In particular, the anode of each of the diodes 42 is coupled to the recovery rail circuit 41, while its cathode is connected to its corresponding row rail. The upper end of rail circuit 41 is coupled to a recovery control circuit 43 which typically can be a transistor switch. Diodes 42 are selected to have minority-carrier lifetimes which are equivalent to the minority-carrier lifetimes of diodes 22.

In operation, control circuit 43 maintains all the diodes 42 in reverse bias mode until a specific capacitor 31 is energized. Matrix 10′ is then returned to its initial state by applying a positive potential to rail 41 sufficient to forward-bias all the diodes 42. Any excess charge on the capacitors 31 is thereby discharged through its corresponding diode in array 42. Since, the latter diodes have minority-carrier lifetimes which are much smaller than those of diodes 18, the recovery time of the matrix is significantly decreased.

Figure 4:
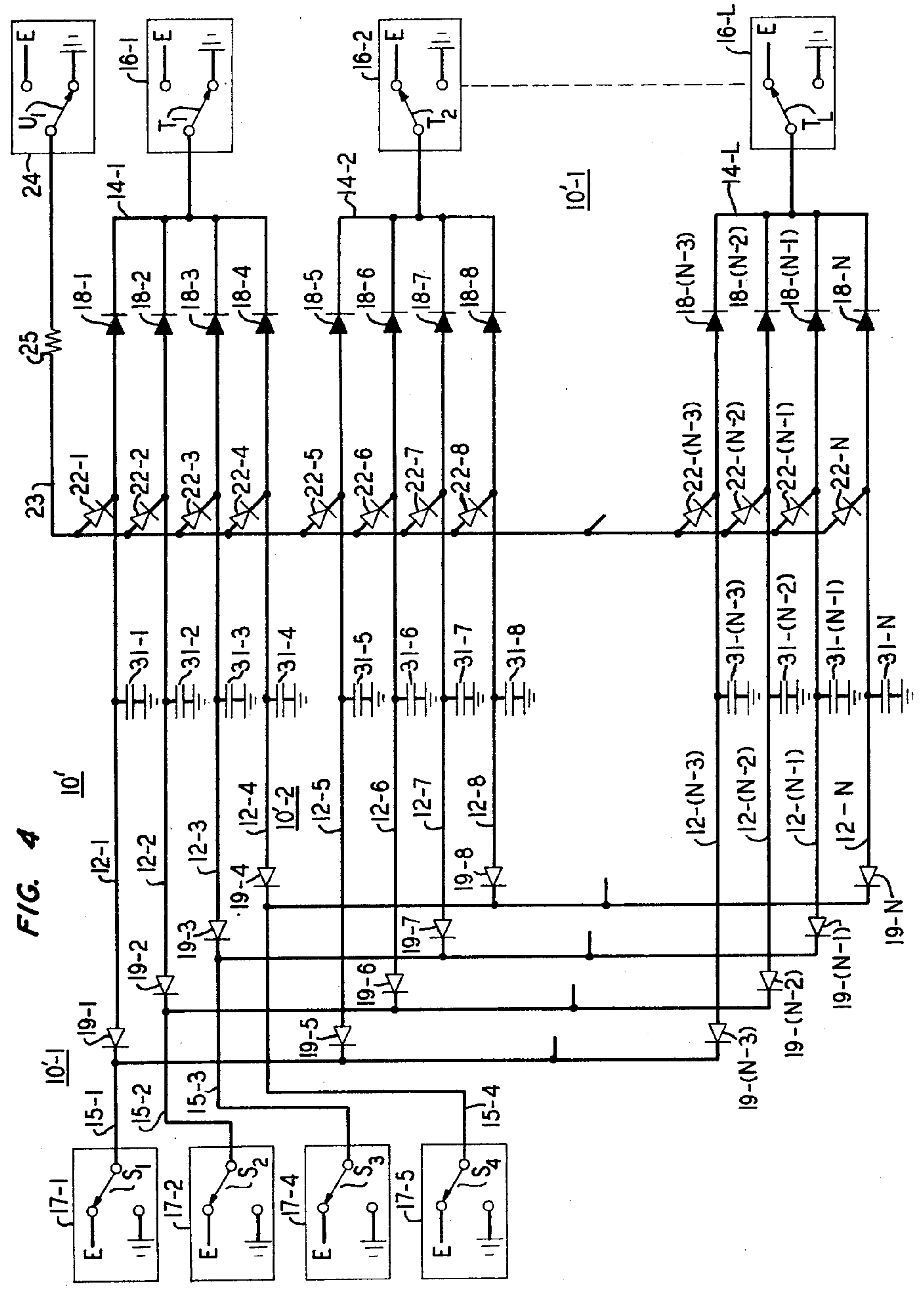
FIG. 4 is illustrative of a simplified version of another embodiment of a tandem matrix in accordance with the principles of the present invention.

In FIG. 4, another embodiment of the present invention is illustrated. This embodiment is substantially similar to the embodiment of FIG. 1 except that here diodes 19 have minority-carrier lifetimes which are at least an order of magnitude less than the minority-carrier lifetimes of diodes 18. It is preferable, however, that diodes 19 have minority-carrier lifetimes which are at least two orders of magnitude (i.e., $10^2$) less than those of diodes 18. This can be achieved, for example, by using Schottky diodes for diodes 19.

Discussion of the present embodiment will be in terms of the simplified version of the matrix illustrated in FIG. 4. This version is substantially similar to that of FIG. 2 except for the use of Schottky diodes as diodes 19.

As in the previous embodiment, prior to the selection of any one of the row rails 12 of matrix 10′–2, switches $S_1$ to $S_4$ of circuits 17–1 to 17–4, respectively, clamp their corresponding selection control rails 15–1 to 15–4 to positive potential E. Switches $T_2$ to $T_L$ of circuits 16–2 to 16–L, similarly, couple their corresponding selection control rail circuits 14–2 to 14–L to positive potential E. Switches $T_1$ and $U_1$ of circuits 14–1 and 24, on the other hand, clamp their respective rail circuits to ground potential. Thus, in the quiescent state, indicated in FIG. 4, each of the diodes 18, diodes 19 and diodes 22 is nonconducting.

In operation, excitation of a particular one of the capacitors 31, for example capacitor 31–1, of matrix 10′ is accomplished by the following sequence of switching operations. Switch $U_1$ is momentarily coupled to positive potential E and then returned to and held at ground potential. Thereafter, switches $T_2$ and $T_L$ are simultaneously connected to ground potential, after switches $S_2$ to $S_4$ are similarly simultaneously coupled to ground. With switches $S_2$ to $S_4$ and switches $T_2$ to $T_L$ retained in the latter positions, switch $T_1$ is coupled to the potential E, thereby completing the switching sequence and effecting the required charge-storage in capacitor 31–1.

More particularly, excitation of capacitor 31–1 is initiated by the action of switch $U_1$ which clamps one end of resistor 25 to positive potential E, thereby causing a positive potential to be applied to feed rail 23. Since selection rail 14–1 remains at ground potential, via switch $T_1$, the positive potential on rail 23 causes diodes 18–1 to 18–4, and their corresponding diodes of diode array 22, to become forward-biased. Thus, current flows from circuit 24 through diode combinations (22–1, 18–1), (22–2, 18–2), (22–3, 18–3) and (22–4, 18–4) in the forward direction, and from the latter diodes through switch $T_1$ to ground. As a result of the forward current flow, each of the charge-storage diodes 18–1 to 18–4 stores a quantity of charge.

The positive potential on rail 23 similarly forward-biases the remainder of the diodes in array 22. However, since rails 14–2 to 14–L are clamped to potential E, the positive potential on rail 23 is insufficient to also forward-bias diodes 18–5 to 18–N. Thus, no current flows through each of the latter diodes.

After the switch $U_1$ is returned to ground potential, each of the diodes 22 and each of the diodes 18–1 to 18–4 cease to conduct. The latter diodes, however, retain the charge accumulated during forward conduction.

Switches $S_2$ to $S_4$ are then, simultaneously, switched to ground potential, thereby clamping rails 15–2 to 15–4 to that potential. Subsequently, rail circuits 14–2 to 14–L are similarly, simultaneously, clamped to ground through switches $T_2$ to $T_L$, respectively.

Immediately thereafter, switch $T_1$ is coupled to potential E, thereby clamping rail 14–1 to the latter potential. The potential E is coupled through rail 14–1 to the cathodes of diodes 18–1 to 18–4, thereby causing the charge stored in these diodes to be transferred out of the diodes by reverse conduction. Since, however, diodes 19–2 to 19–4 become forward-biased when diodes 18–2 to 18–4 being to conduct in the reverse direction, the charge in each of the latter three diodes is expelled prior to the charge in diode 18–1. The charge from diodes 18–2 to 18–4, respectively, is transferred over rails 12–1 to 12–4, through diodes 19–2 to 19–4 and directed to ground via switches $S_2$ to $S_4$.

After diodes 18–2 to 18–4 have expelled substantially all their stored charge, diode 18–1 begins to conduct in the reverse direction. Diode 19–1, however, remains nonconducting due to the potential E coupled to its cathode through rail 15–1. As a result, the charge in diode 18–1 is transferred over rail 12–1 into capacitor 31–1 and is stored therein. Thus, excitation of capacitor 31–1 by selection of rail circuit 12–1 is complete.

When diode 18–1 is conducting in the reverse direction, diodes 18–2 to 18–4 have ceased to conduct and have returned to a reverse bias mode. When operating in this mode, each of these diodes conducts a finite amount of leakage current in the reverse direction. Thus, leakage current flows into rails 12–2 to 12–4 when diode 18–1 is conducting in the reverse direction. The latter three rails, however, each reside at a voltage which is slightly below the voltage required to bring diodes 19–2 to 19–4 into strong forward conduction. The leakage current in each of the rails 12–2 to 12–4, therefore, in trying to raise the voltage of the rail, brings the diode 19, associated with the rail, into forward conduction. Thus, forward conducting diodes 19–2 to 19–4 establish low impedance paths to ground, thereby causing the leakage currents in rails 12–2 to 12–4, respectively, to be shunted to ground and, as a result, to bypass their respective capacitors 31. Hence, the noise in the rail loading capacitors which would have been generated by the aforesaid leakage currents is substantially eliminated.

It should also be noted that any currents coupled between row rails 12 as a result of inherent capacitive coupling is similarly shunted to ground through the low impedances provided by diodes 18 and 19. In the case of rail circuits 12–5, 12–9,...12–B'(N-3), forward biased diodes 18–5, 18–9,...18–(N-3), respectively, provided the low impedance paths. In the case of each of the other remaining rails, a shunting path is provided by either its respective diode in array 18 or array 19.

Once a particular capacitor 31 has been energized, matrix 10' can be returned to its initial state merely by switching switch $S_1$ to ground potential. Any excess charge stored on capacitor 31–1 is thereby instantaneously shunted to ground via diode 19–1. Thus, advantageously, in this embodiment, fast recovery of matrix 10' can be accomplished without the use of any additional circuitry.

It is to be understood that the embodiments described herein are merely illustrative, and that numerous and varied other arrangements can readily be devised in accordance with the teachings of the present invention without departing from the spirit and scope of the invention. In particular, in the embodiment of FIG. 1, having to switch the switches $S_1$ to $S_4$ from an initial potential E to ground potential can be avoided by including charge-storage diodes, poled in the direction of the switches, in selection rails 15–1 to 15–4. The presence of such diodes enables the switches $S_1$ to $S_4$ to be coupled initially to ground potential.

What is claimed is:

1. A tandem matrix comprising:

a first matrix including first and second sets of rail circuits, and a plurality of loads, each of which connects one of said rail circuits in said first set to one of said rail circuits in said second set;

a second matrix for selecting the rail circuits of said first set including third and fourth sets of rail circuits;

and means for coupling each of said rail circuits of said first set to said rail circuits of said third and fourth sets comprising a first plurality of diodes, each located at one end of a different one of said rail circuits of said first set, and a second plurality of oppositely poled diodes, each located at the other end of a different one of said rail circuits of said first set..

2. A tandem matrix in accordance with claim 1, in which, the anodes of said first diodes and the anodes of said second diodes are coupled to the rail circuits of said first set, and the cathodes of said first diodes and the cathodes of said second diodes are coupled to the rail circuits of said third and fourth sets.

3. A tandem matrix in accordance with claim 1 which includes, in addition:

a feed rail circuit;

means for connecting each of said rail circuits of said first set to said feed rail circuit comprising a third plurality of diodes.

4. A tandem matrix in accordance with claim 3 in which each of said third diodes is a Schottky diode.

5. A tandem matrix in accordance with claim 3 which includes, in addition:

means for selectively applying electrical potentials to said rail circuits of said third and fourth sets;

means for selectively applying electrical potentials to said feed rail circuit;

and means for selectively applying electrical potentials to said rail circuits of said second set.

6. A tandem matrix in accordance with claim 1 in which each of said first diodes is a charge-storage diode.

7. A tandem matrix in accordance with claim 6 in which each of said second diodes is a charge-storage diode.

8. A tandem matrix in accordance with claim 7 which includes, in addition:

a recovery rail circuit;

and means for connecting each of said rail circuits of said first set to said recovery rail circuit comprising a fourth plurality of diodes.

9. A tandem matrix in accordance with claim 6 in which said second diodes have minority-carrier lifetimes which are at least an order of magnitude less than the minority-carrier lifetimes of said charge-storage diodes.

10. A tandem matrix in accordance with claim 9 in which each of said second diodes is a Schottky diode.

11. A tandem matrix in accordance with claim 1 in which said first set of rail circuits is arranged in a plurality of groups, each of which comprises those rail circuits of said first set which are coupled to a particular one of the rail circuits of said third set.

12. A tandem matrix in accordance with claim 11 in which one rail circuit in each of said groups is coupled to the same rail circuit of said fourth set.

13. A tandem matrix in accordance with claim 1, which includes, in addition:

a third matrix for selecting the rail circuits of said second set, including fifth and sixth sets of rail circuits;

and means for coupling each of said rail circuits of said second set to said rail circuits of said fifth and sixth sets comprising a fifth plurality of diodes, each located at one end of a different one of said rail circuits of said second set, and a sixth plurality of oppositely poled diodes, each located at the other end of a different one of said rail circuits of said second set.

* * * * *

UNITED STATES PATENT OFFICE

CERTIFICATE OF CORRECTION

Patent No. 3,651,468 Dated April 17, 1972

Inventor(s) Sigurd G. Waaben

It is certified that error appears in the above-identified patent and that said Letters Patent are hereby corrected as shown below:

Column 5, line 36, delete "18-B(N-3)" and insert --18-(N-3)--.

Column 7, line 2, delete "being" and insert --begin--.

Column 7, line 6, delete "12-1" and insert --12-2--.

Column 7, line 40, delete "12-B'(N-3) and insert --12-(N-3)--.

Signed and sealed this 18th day of July 1972.

(SEAL)
Attest:

EDWARD M.FLETCHER,JR.
Attesting Officer

ROBERT GOTTSCHALK
Commissioner of Patents

FORM PO-1050 (10-69)

USCOMM-DC 60376-P69
☆ U.S. GOVERNMENT PRINTING OFFICE : 1969 O—366-334